J. H. BONHAM.
Seed-Planter.
No. 28,343.
Patented May 22, 1860.
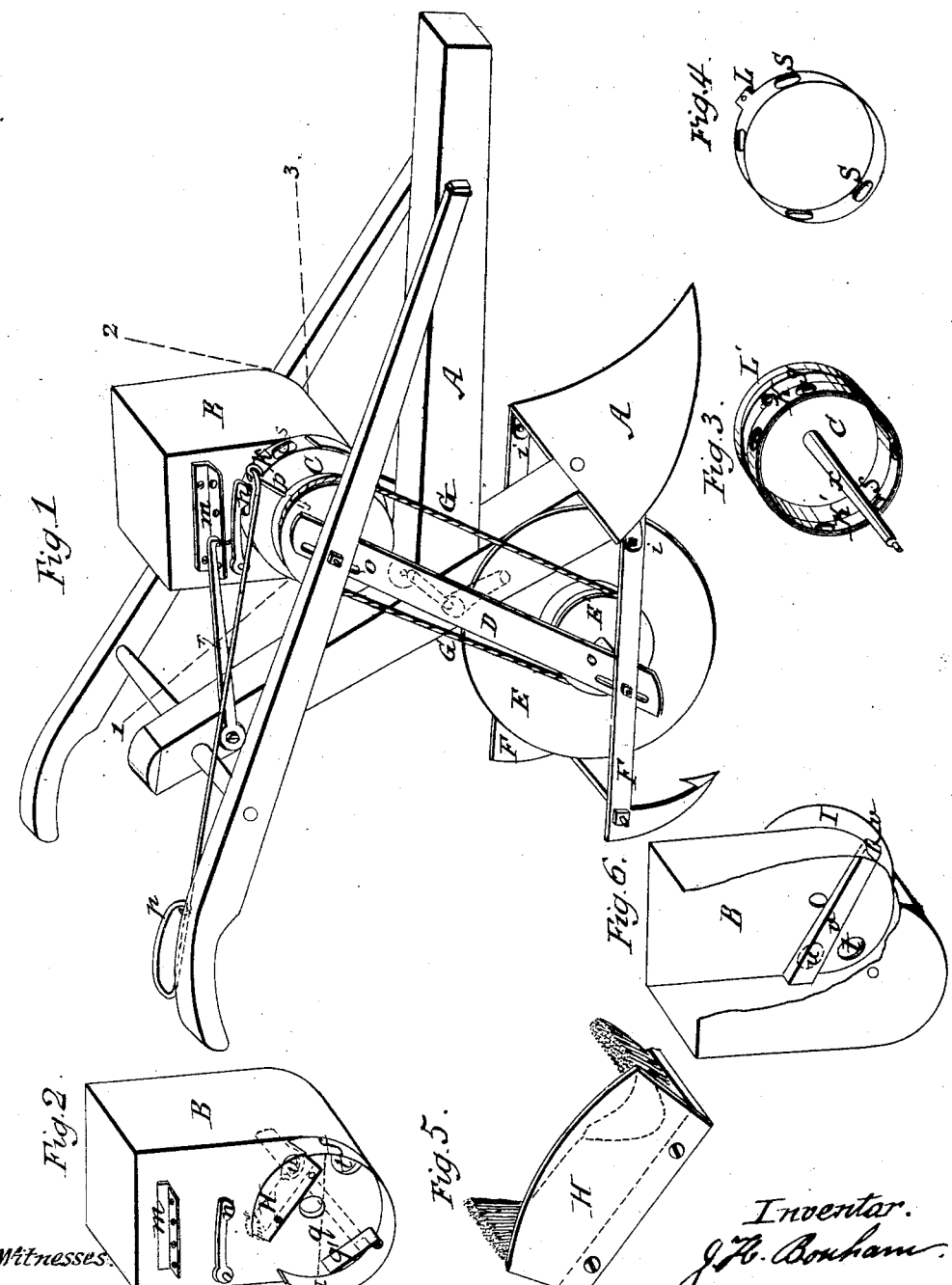
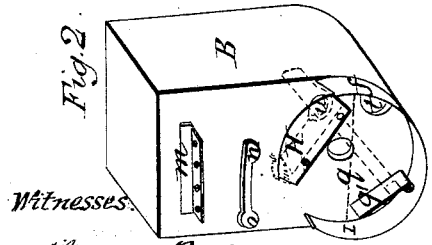
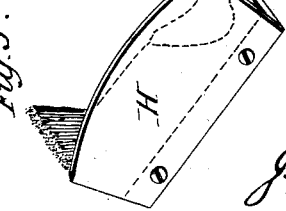

UNITED STATES PATENT OFFICE.

J. H. BONHAM, OF ELIZABETHTOWN, OHIO.

IMPROVEMENT IN CORN-PLANTERS.

Specification forming part of Letters Patent No. 28,343, dated May 22, 1860.

*To all whom it may concern:*

Be it known that I, JACOB H. BONHAM, of Elizabethtown, in the county of Hamilton and State of Ohio, have invented a new and useful Improvement in Corn-Planters; and I do hereby declare that the following is a full, clear, and exact description of the construction and operation of the same, reference being had to the annexed drawings, making a part of this specification, in which—

Figure 1 is a perspective view of the machine. Fig. 2 is a perspective view of the hopper. Fig. 3 is a perspective view of the seed-reservoir C, Fig. 1. Fig. 4 is a perspective of the ring K K', Fig. 3. Fig. 5 is a perspective of the brush H, Fig. 2. Fig. 6 is a broken section of the hopper B, Fig. 1.

In Fig. 1, A A A is a common shovel-plow.

F F are covering-flukes, hinged to the plow at $i\ i$, and secured in the rear by a rod and screws.

D D are standards, with slots $o\ o$, which are bolted fast to the flukes F F and the handles of the plow, forming a frame-work for the driving-wheel E and the seed apparatus B C. The slots $o\ o$ allow the flukes to be raised or lowered to cover shallow or deep. They also allow the driving-wheel E to be raised or lowered for the purpose of regulating the depth of the furrow.

E is the driving-wheel, whose axis and journals work in the standards D D.

E' is a pulley attached to the axle for the purpose of rotating the seed-reservoir C, with its rings and cups, by the cord G G.

$n$, Fig. 1, is a drop-hammer, which falls on the cavities to loosen any grain that may be fast. $m$, Fig. 1, is a flange with holes in it, attached to the side of the hopper B.

$r$, Fig. 1, is a hook pivoted to the stem of the plow, which is to secure the hopper at any desired inclination backward or forward for regulating the quantity of corn to be dropped. By securing it at the inclination forward of the line 1 it will drop more; at the line 2 it drops less; at the line 3 it ceases to drop. This movement is easy, as the hopper turns on the axis $x$ of the seed-reservoir C, Fig. 3. This movement forward brings the upper end of the brush H, Fig. 2, close to the line $y$, same figure, which is the height of corn in the reservoir C, Fig. 3. Thus the cups are forced over the brush heaping full. When the hopper is perpendicular the surplus corn in the cups falls back inside in passing from $y$, Fig. 2, to the brush. When the hopper is thrown forward to the line 3 the cups deliver themselves before they reach the brush. This ease of adjusting the quantity of corn is one of the best features. If one half of the row to be planted is very cloddy and the other half in good order, the cloddy end of the row may be dropped very thick by throwing the hopper back. In cloddy ground much of the corn cannot grow through the clods. What comes up must come between them. Hence more seed is needed.

$p$ is a handle, and $p'$ an arm attached to the seed-reservoir C, Figs. 3 and 1, for dropping check-rows. This is done by taking off the cord G G and out the driving-wheel E, Fig. 1. Then the loop on the rod $p$ is taken in the hand of the operator while he grasps the handle of the plow. Then by moving the hand back and forth a single seed-cavity is put in the corn and over the brush by the vibratory motion. The cup S', Fig. 1, goes in near $t$, Fig. 2, the orifice for supplying corn from the hopper B to the reservoir C, Figs. 1 and 3. Then by drawing back the cup and corn are carried over the lower end of the brush H, Fig. 2, when the corn passes out of the aperture $u$ into the spout $v$, Figs. 2 and 6, finding its exit through the stem of the plow at $a$, Fig. 1, the same way as in drilling.

H, Fig. 2, is an open brush, with a row of bristles at each end and a curved piece of leather at the side, thus forming a box or hopper for the corn as it falls from the cups, standing inclined downward with the side next the orifice $u$, Figs. 2 and 6, scalloped off, as represented by the curved and dotted lines in Fig. 5.

I I, Figs. 1, 2, and 6, is a circular flange, open at the top, attached to the hopper B, in which the rings K and K' revolve.

$q$ is a spring inclined upward and fast at the lower end, standing across the reservoir to keep the corn from being carried above the line $y$, Fig. 2.

Fig. 3 is the seed-reservoir, with its axis $x$, which passes through the hopper B, Figs. 1, 2, and 6, while its journals run in the standards D D.

S S are the seed-cavities made by two rings, the outer one, K, being thick and the inner one, K', being thin and fitting inside of K, Fig. 3. They each have oblong holes to match.

The inner ring, Fig. 4, has an ear, L, for the screw L', Fig. 3. The inner ring is inserted in the outer one, K, as in Fig. 3, so as to cover up one-third or more of the oblong holes in K, thus making a cup when inserted in the flange I I, Fig. 2. The slot and screw L', Fig. 3, secure the ring at any desired point. This leaves an opening through the inner ring for the corn to fall into the cavity while passing through and under the corn in the reservoir; and when over the brush H, Fig. 2, the grain falls forward as the ring goes downward, when the grain passes out of the same opening of the ring into the brush.

To enable others to make and use my improvement, I give the subjoined description of its construction.

To a common shovel-plow, which should be eleven inches across the top, I hinge five inches from the center and near the top of the plow two flukes, made of common bar-iron sufficiently strong, one of them two feet six inches long, the other two feet ten inches, the back ends to be drawn to a point with small mold-boards, one to the right, the other to the left, so as to throw the dirt to each other. Then I bend ten inches of the back end in a curve forward, so as to give a suction downward when they are in the ground, so as to hold the driving-wheel firmly on the bottom of the furrow. I then secure them in the rear by a screw-bolt ten inches wide, making a square frame behind the plow for the wooden standards D D, Fig. 1. These standards should be two feet long, three inches broad, and three-fourths of an inch thick, with slots and holes near each end for the bolts and journals. These should be bolted fast to the flukes, with a proper inclination forward, so as to allow the seed apparatus to come in above the beam and back of the plow-stem. Then the upper end must be bolted to the plow-handles. The frame-work is then ready for the driving-wheel, which is cast fifteen inches in diameter; axis, ten inches; pulley, four inches in diameter. The seed-reservoir is cast with an axis of ten inches, a pulley of five and one-third inches in diameter, and a flange or ring six inches in diameter, one and one-half inch wide, one-fourth inch thick, with six oblong holes one and one-half inch long, and equidistant, with a slot one and one-fourth inch long. This flange should be turned true and smooth. I then make a ring of tin of the same size, with oblong holes to match. To this I solder a tap for the temper-screw. I then turn up the cast flange to fit over the dropping flange or ring. This flange should be open at the top and one and one-fourth inch wide. This is screwed fast to the hopper, which should be six and one-half inches wide by five inches and one foot deep, with a lid. Inside of the open flange I secure the brush H and the spring $q'$ in the position shown in Fig. 2. I then pivot the hammer $n$ and secure the flange $m$, as shown in Fig. 2. I then make the hole $c$ for the ingress and egress of the grain, also for the axis in the center. The seeding apparatus is then ready to place in the frame. I then secure the hook $r$ to the stem of the plow. I then cord up the pulleys, when the machine is ready for drilling. I then make a small rod of sufficient length, with a loop at one end, while the other is hinged to a short arm attached to the seed reservoir or hopper. I then open the seed-cavities by throwing the inner ring back and screwing it fast. It is then ready for dropping check-rows.

I claim—

1. The seed-reservoir C, in combination with the hopper B, operated by the driving-wheel E in the manner and for the purpose set forth.

2. The combination of the pivoted hopper B, perforated flange $m$, hook $r$, brush $h$, and ring K, constructed, arranged, and operating substantially as and for the purposes set forth.

J. H. BONHAM.

Witnesses:
  SUE M. BONHAM,
  THOMAS MARSHALL.